United States Patent Office 2,971,217
Patented Feb. 14, 1961

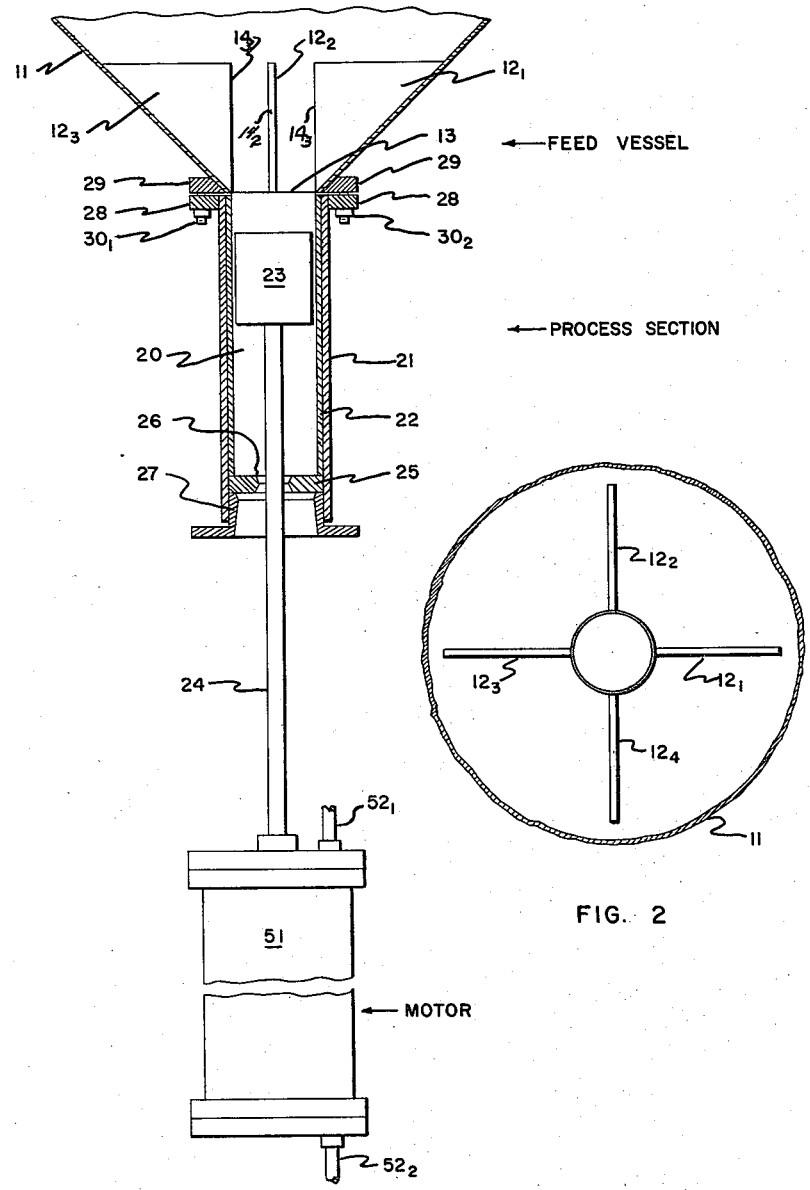

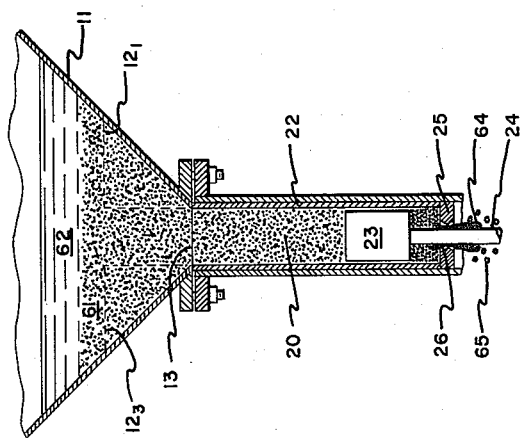
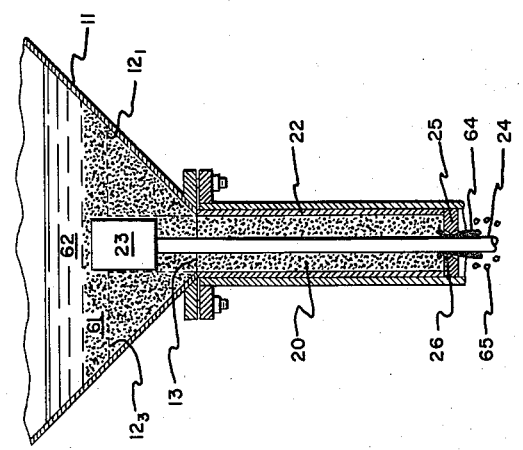

2,971,217

SLUDGE DELIQUEFYING APPARATUS

Henry A. Thomas and James H. Browning, Baton Rouge, La., assignors to Ethyl Corporation, New York, N.Y., a corporation of Delaware Filed Apr. 30, 1959, Ser. No. 810,060

5 Claims. (Cl. 18—1)

This invention relates to apparatus for processing sludges. More particularly, the invention comprises a new and improved apparatus and method for the processing and liquid separation of sludges of the high solids variety, wherein the solids are predominantly deformable metal particles.

In many industrial processes, side streams or by-product streams are encountered consisting of high solid sludges, that is sludges wherein the solids comprise a substantial portion both by weight and by volume. Heretofore, the accepted mode of resolving these sludges into suitable components has involved a thermal drying operation, usually followed by a smelting or metallurgical treatment of the solids comprising sub-divided metal particles. An illustrative process wherein such an operation is carried out involves the manufacture of, for example, tetraethyllead, wherein a sludge is encountered which consists of finely sub-divided lead metal particles, and a liquid phase or phases, including an aqueous phase comprising a dilute solution of a metal salt, such as sodium chloride, plus minor amounts of liquid tetraethyllead. When recovering the usable components of such a system by the above described previous practice, considerable difficulty and expense is encountered, owing to the fact that a thermal drying operation is inherently expensive. In addition, the smelting and recovery of very finely divided metal particles, which are quite susceptible to further oxidation, is at best a cumbersome and inefficient process. One of the difficulties in such an operation has been that a large portion of the finely divided solids are lost, or are further oxidized to an oxide component.

Similar problems exist when processing other metal liquid sludges having similar characteristics, particularly in the cases of metals which are readily reactive and wherein the overall reactivity is accentuated by the high ratio of surfaces to weight, in finely sub-divided material.

An object of the present invention is to provide a significantly new and improved apparatus and method whereby an extremely high degree of separation of solids and liquids is achieved and in addition, the finely divided solids are converted into readily smeltable, relatively massive, homogeneous solid shapes. It has been found that by the application of sufficient pressure on portions or segments of the sludge in a closed chamber provided with an opening at one end thereof, said opening being of smaller cross sectional area than the area of the chamber, the liquid and solid phases can be readily segregated and concurrently the solids can be formed into more or less homogeneous, relatively massive shapes, which are much more readily recovered by melting and can be easily handled, relative to the finely divided solids heretofore encountered. A further specific object of the present apparatus is to provide apparatus in combination with a storage and feed chamber for the sludge as it becomes available, which circumvents certain difficulties encountered heretofore in attempting to feed or introduce charges of the sludge into such a processing chamber. An additional object is to provide, again, in combination with a feed chamber, a processing apparatus for achieving the solid-liquid separation and the conversion of solids in form to the desired solid shapes, which itself exhibits substantial advantages over prior processing units. Further, the apparatus of the present invention utilizes the processing unit in a dual capacity to circumvent certain storage and feeding problems associated with a processing unit. Another object is to provide apparatus which avoids certain mechanical difficulties associated with a reciprocating type process unit for treating sludge as generally described, which difficulties were associated with gouging or bending of the parts, as will be clear hereinafter.

In its most general form, the apparatus of the present invention includes a hopper or storage vessel for the sludge as it is received from preceding process steps. The storage vessel has a portion or a bottom zone which is of lowest elevation of the sludge containing space, and associated with said bottommost or discharge portion of the supply chamber or hopper is a processing unit. The processing unit includes a generally elongated chamber of uniform cross section, which is, preferably, aligned vertically, and has one end opening into the hopper at the lowermost portion thereof. At the other end of the chamber is provided a die plate, which has an aperture or die proper wherein the solids can be removed by elements described below. Reciprocating within the chamber is a processing or working piston, which is an enlargement of or is attached to a piston rod projecting downwardly therefrom and also passing through an aperture in the die plate. The proportions of the processing chamber and of the piston rod and piston are such that upon full movement of the piston upwardly in the chamber, actual removal thereof from the chamber and insertion into the supply zone is provided, thus establishing an opened area whereby the chamber itself can be filled by a charge of sludge supplied from the feed zone. The piston is, as mentioned, capable of reciprocatable action, and upon being returned in a vertical path downwardly through the chamber, the charge of sludge which has been introduced therein, is compressed and squeezed by the piston through a variable pressure range, culminating in sufficient pressure so that the solids of the sludge are forced through the die opening in the die plate. The piston rod, as mentioned, projects out of the chamber and is engaged by motor means which can be one of several known actuating devices, or indeed, if the economics are appropriate, the piston means can be actuated by manually operated linkages, levers or similar devices. In conjunction with the conversion of the solids of the sludge into homogeneous shapes accompanied by the action of the apparatus described above, the liquid phases are concurrently disengaged from the solids, usually in two apparent steps. The first phase accompanies the initial traverse of the piston in the chamber in a downward path, and results in primarily the movement together of the particles of the sludge charged, which results in back flow of the liquid past a minor clearance provided between the chamber and the piston, this flow being usually at a relatively significant velocity whereby certain desirable agitation is achieved as hereafter described. The final phase of the processing step is the actual movement of the predominantly solid particles at relatively high pressure toward and through the die aperture. It is found that this movement is responsible for and provides a high degree of mechanical working together of the particles, which in fact causes mechanical cohesion and cold working of malleable materials such as lead whereby the material forced through the die proper is in the form of a solid shape.

The details of the improved apparatus of the present invention and the mode of operation thereof will be readily understood from the description hereinafter and the figures, wherein;

Fig. 1 is an elevational schematic sectional view of a typical apparatus of the invention, including the motor means, and Fig. 2 is a plan view showing a portion of the hopper or supply chamber and certain portions of the processing unit associated therewith, and Fig. 3 is a schematic illustration of the relative disposition of the parts of the apparatus and of the sludge portions being processed, at one portion of a cycle, viz., when the piston of the apparatus is at the highest extremity of its travel, and Fig. 4 is a comparable schematic illustration of the position of the several elements of the apparatus when the piston is at substantially the lower-most portion of its reciprocatable cycle, and the material being processed.

Referring to Figure 1, it is seen that this embodiment of the invention includes, in combination, a feed vessel shown in part, a processing assembly, and a motor unit for actuating the process assembly.

Considering the processing apparatus particularly, this includes a cylindrical chamber 22, which is a hardened sleeve surrounded by a snugly fitting outside chamber 21. The inner sleeve 22 is somewhat shorter than the cylinder 21 comprising the outer wall, thereby providing a shoulder for receiving a die plate 25. The lower extremity of the outer chamber wall 21 is threaded to engage a threaded collar 27, which positions and snugly fastens the die plate 25 against the terminus of the cylindrical liner 22. Snugly, but slidably mounted in the chamber formed by the liner 22 is a piston 23. The piston fits fairly snugly against the wall of the liner 22 but has sufficient clearance for purposes hereafter described. Projecting downwardly from and attached to the piston 23, is a piston rod 24, which extends through an aperture 26 in the die plate 25. The piston rod 24 extends into or connects to and is actuated by a hydraulic motor 51 which includes a cylinder-piston combination of the double acting type, provided with feed and discharge conduits $52_1$, $52_2$ at the ends of the motor, for reciprocating action to be applied to the piston rod 24 and thence the piston assembly 23 of the processing assembly.

Attached to the upper extremity of the outer casing or cylinder 21 of the process assembly is a flange 28. Surmounting and forming the top portion of the apparatus in combination is a segment 11 of a feed chamber for fresh sludge. In this particular embodiment, this bottom most portion of the feed vessel is in the form of a truncated cone which terminates in an opening 13 corresponding in diameter and configuration to the cross section of the space defined by the liner 22 of the processing assembly. A plurality of plate-like guide members $12_1$, $12_2$, $12_3$ are attached to the interior of the above mentioned conical extremity 11 of the feed vessel. These guide members have edges or boundaries including portions $14_1$, $14_2$, $14_3$ which provide an extension in part of the walls of the processing assembly liner 22.

It will be seen that movement of the piston 23 of the processing section to the most upwardly position will raise this compartment to the interior of the feed vessel bottom and establish an opening permissive of movement of material to the interior of the processing section. The processing section liner 22 and the piston rod 24 define an annular space 20 of variable length into which the feed material is introduced. When the piston assembly 23 is at the bottom most position under the influence of the actuating motor, the face thereof is substantially adjacent the inner portion of the die plate 25. The relative disposition of the feed vessel portions and the operative elements of the processing section is further illustrated by Fig. 2 being a plan showing the interior of the feed vessel. Referring to Fig. 2, the upper end of the piston 23 is shown and the disposition of the guide members $12_1$, $12_2$, $12_3$.

The mode of operation and the benefits of operation of the present apparatus will be clear from Figs. 3 and 4, which illustrate schematically the condition of the materials being processed at several stages in an operating cycle, an operating cycle being a full reciprocation of the piston assembly 23. Referring to Fig. 4, this shows elevation of the piston 23 at the upper-most position of its travel, positioned entirely above the opening 13 at which the feed section 11 is joined to the process unit chamber 20. The alignment of the piston, with respect to the extended piston rod 24 is assured by engagement of the shoulder portion 23, with the alignment members $12_1$, $12_2$, $12_3$ forming segments within the feed section 11. A feed opening is thus established between the bottom of the processing unit piston 23 and the opening 13 into the process unit.

The charge to the apparatus is a sludge 61, composed of finely divided particles of lead metal, immersed in a liquid phase comprising predominantly a salt solution, but also including minor quantities of tetraethyllead. The lead particles are high surface solids having numerous pores, or interstices therein, serving as entrapment means for residual quantities of tetraethyllead from the preceding process steps. Usually, the sludge proper is surmounted by a layer of liquid phase 62 which can be solely aqueous phase introduced in the raw sludge, or can be formed from some of said aqueous phase plus added liquid.

Under the influence of gravity and a feeding action hereafter described, the space defined in the processing unit by the liner wall 22 and the piston rod 24 is substantially filled with raw sludge. At the bottom of the chamber is a solidified portion of substantially homogeneous lead 64, including a portion within the processing chamber, extending through the die aperture 26, and projecting to some degree beyond the die.

After establishment of the system as described above, with reference to Fig. 3, the piston is moved downwardly by tension applied to the piston rod 24 by the motor element, through the chamber liner 22, thereby developing pressure on the sludge charge. It is found that the application of pressure in this manner is accompanied by several distinct phases. Firstly, initial pressure results in a compaction of the solids, this movement being essentially the movement of the particles closer one to the other, accompanied by an expression of the liquid therefrom. The liquid flows largely upwardly past the shoulder of the piston, in the minor clearance established between the piston and the chamber liner 22. This initial movement is accompanied by a relatively modest pressure, inasmuch as no appreciable or major deformation of the lead solid particles occur. After part travel of the piston 23 downwardly in this fashion, a second phase occurs which is a deformation of the already compacted lead solids under significant pressures of the order of, 10,000 to about 20,000 pounds per square inch.

Under the influence of these pressures, the lead particles flow and in the course of movement are mechanically worked together and passed through the aperture or die 26 in the die plate. During this phase some additional removal of liquid occurs, this liquid forming as a film on the surface of the solids pressed through the die aperture 26, or even as a substantial quantity of droplets 65.

The relative posture of the apparatus elements and of the material being processed, in a portion of this phase of operation is illustrated in Fig. 4. Referring to Fig. 4, this shows the piston assembly at a position approaching the die plate 25. It is seen that the effective density of the solids is substantially increased, this approaching the density of lead metal. The portion of the lead which has passed through the die aperture 64 is, in this embodiment, in the form of a tubular portion surrounding the piston rod 24. Owing to the high stresses imparted by the die, and particularly by the configuration of the die in this embodiment, the passage out of the aperture is accompanied by sufficient stresses to provide cracking, so that in most instances the tubular member will fall from the piston rod 24 for collection and subsequent smelting. However, in some cases, and in processing other metals, for example, it is sometimes necessary to have a disengaging blade or knife to accomplish this step.

The downward movement of the piston is terminated a short distance away from the die plate. The motor actuating the piston rod is then reversed and the piston 23 is shoved upwardly to terminate in a position within the interior of the feed vessel as described with reference to Fig. 3. During the upward motion, the linear velocity of movement is substantially greater than the downward movement, owing to the fact that resistance to travel is appreciably less, consisting primarily of the hydrostatic head of materials which may be accumulated or piled on top of the piston assembly 23. This relative rapidity of motion, plus the fact that the clearance between the piston 23 and the chamber liner 22 is quite minute, is responsible for the attainment of a substantial and highly desirable degree of vacuum. Thus, after the piston 23 passes the opening 13 into the feed vessel, a substantial differential in pressure exists between the sludge charge 61 proper and the interior of the processing unit in the processing space 20. Under the influence of this pressure, rapid flow of additional sludge to reestablish the condition prior to a working or downward stroke, as illustrated in Fig. 3, is readily achieved. Another highly beneficial effect of the action during an upward stroke is that the piston 23 not only assists in establishing a vacuum conducive to feed of sludge into the processing space 20, but further the upward movement results in a high degree of agitation of the sludge within the feed vessel 11.

It will be readily apparent that the proportions and particular configurations of the components of the apparatus of the invention described above, and the mode of operation, are susceptible of a great degree of variation as discussed more fully below.

The actual pressure applied on the sludge charged with a processing chamber is susceptible to many degrees of variation depending upon various factors, and including the composition and proportions of the sludge. Additional factors which affect the pressure which the piston should be capable of applying to a particular charge include the working ratio, that is the ratio of the cross sectional area of a sludge charge within the processing chamber to the corresponding area of the die aperture available for passage of the solid particles. When processing sludges obtained from the manufacture of organo-lead compounds such as are described above, typical operating pressures, depend upon several factors, can vary from about 5,000 pounds per square inch up to, if desired, about 60,000 pounds per square inch. It will be understood that these pressures are not necessarily applied during the entire downward or working stroke, but represent the pressures necessary during the phase of operation wherein a mechanically worked, homogeneous lead shape is being forced through the die aperture. Generally, pressures in the range of 10,000 to 20,000 pounds per square inch are preferred. It is found that pressures of the above magnitude are fully capable of substantially eliminating all liquid phases from the lead particles, and forcing the lead through the die in the form of a substantially homogeneous solid shape. When other metals than lead are the metallic components of a sludge charged, the pressures required will frequently vary. Generally, most metals suitable or found as components of sludges to be processed will require somewhat higher pressures an in the case of lead metals.

A significant factor in the embodiments of the invention is the working ratio or extrustion ratio, this variable being the ratio of the transverse area of a charge within the processing zone, to the area of the die aperture available for passage of the solids from the unit. Here again, the high degree of variation is perfectly permissible depending upon many factors associated with the materials being processed. In the case of sludges from an organo lead process, ratios of the order of 2:1 to 60:1 have been found quite operable. When a lower ratio in this range is used, for a given rate of piston travel at a constant linear velocity, a lower pressure will be required. However, application of a higher pressure will result in a more rapid movement of the piston, and generally, within limits, the same result insofar as separation of liquid, phases and the conversion of the lead solids into homogeneous shapes. This relationship is not consistent or true, however, when extrusion ratios below a certain level for a particular system are established. In other words, if the degree of size reduction (proportional to the working ratio) is low, then even the application of quite high pressures, with accompanying real high velocities, will not necessarily result in the desired formation and solids-liquid separation. Accordingly, in preferred embodiments of the apparatus, the proportions are such that a pressure of 10,000 to 20,000 pounds per square inch can be applied on the sludge, in conjunction with a working ratio of the order of 6:1 to 15:1.

The length: diameter ratio of the processing unit chamber 20 is also not highly critical, but certain preferred principles should be observed. Generally, as explained above, one of the unique and highly beneficial features of the apparatus is the dual function of the components with respect not only to converting the lead solids or the metal solids to homogeneous shapes, and to the separation of liquid from the solid phases, but in addition the apparatus provides a highly effective discharge or transport-discharge device for removing high solid sludges from a chamber. Accordingly, the apparatus avoids a problem heretofore encountered of introducing the sludge charges into a chamber. To most effectively take advantage of the several functions described, it is highly desirable that the chamber or processing section should not be unduly long relative to the transverse diameter or area. Typcial and desirable proportions are length to diameter ratios of 1.5:1 to about 2:1, although as stated, these are not highly critical. For more fluid sludges, that is those sludges accompanied by a larger proportion of adherent liquid which tends to increase the fluidity of the sludges, length:diameter ratios above the indicated range can be employed perfectly satisfactorily, but no particular advantage is achieved thereby. Length:-diameter ratios below about 1:1 are to be avoided, in general, because a certain degree of linear piston travel in the processing chamber is highly desirable to assure that a segment of solidified solids are retained in the die aperture and form a relatively tight seal whereby an additional fresh batch of sludge applied on top thereto is retained and can be resisted in its motion prior to additional mechanical working.

As clear from the preceding discussion, substantial variation in the absolute linear speed of the reciprocating elements of the processing apparatus is quite permissible. Typical actual linear speeds are of the order of about 1 to 4 inches per second, although even during a single stroke, particularly a working stroke, the speed will vary depending upon the portion of the working cycle involved.

The particular geometrical configuration of the die plate, and particularly of the die aperture therein is a very important factor for the several embodiments of the process. As illustrated heretofore, in the preferred embodiment, the die aperture performs a dual function in that it provides an opening for the reciprocal movement of the piston rod which actuates the piston of the processing unit. This particular configuration is not essential, and in some instances it can be quite desirable to provide a snugly fitting sliding port for the piston rod, and in such cases, the die aperture for the parting or passage of the metal product is an opening isolated and relatively remote from the piston rod opening. However, because of the relative proportions of sizes of the piston rod compared with the processing chamber space defined by the piston rod and the chamber liner, the die aperture serving both functions is highly desirable. Another variation which is frequently employed involves a die aperture resembling a scalloped configuration in plan view, wherein ribs extend through the aperture and provide bearing surfaces for reciprocating movement of the piston rod. In cases wherein such a die is employed, it will be clear that the metal shape formed by the operation of the apparatus will not be a cylindrical or tubular member surrounding the piston rod as it leaves the chamber, but will have separate configurations corresponding to the scallops or openings of the die.

Another significant factor of die configuration is the profile laterally of the die boundary or aperture. As seen in Fig. 1, a preferred embodiment involves a converging entry cone and a diverging discharge conical section. It has been discovered that such a dual conical element provides a highly effective benefit in operation. As the metal particles are forced under high pressure into the entry cone, they are compressed and mechanically cold worked together to provide a substantially homogeneous shape. As this shape passes the point of smallest cross section and enters the discharge and diverging cone, a minor degree of expansion occurs. Ths expansion is dependent upon the physical characteristics of the metal being processed. Even in the case of lead metal, which is generally considered an inelastic non-springy material, some expansion occurs. Hence, it will be seen that the lead metal shape conforms to the two meeting conical sections and thus tends to become locked in place. This is a highly significant factor, inasmuch as the normal tendency of the lead or other metal shape to accompany the piston rod during a return stroke upwardly is fully negated, and the solids will be retained in the aperture. Retention of the solids at this point serves a highly useful dual purpose in that it effectively seals the bottom of the processing chamber against leakage of fresh sludge charge when introduced, and in addition, during the return stroke, the solid metal seal facilitates in establishing the vacuum which assists the formation of a fresh feed charged as described heretofore.

Another factor pertinent to the efficient operation of the apparatus is the fact that the metal solid shape being formed is forced from the processing zone at a higher linear rate than experienced by the piston and piston rod. In fact, the ratio of the linear velocities of such shapes to the linear velocity of the piston is only, usually, slightly below the working ratio of the apparatus. Thus, for example, if a working ratio of approximately 12:1 is provided, the ratio of linear velocities will be of the order of 10 to 11:1. This difference in velocities assures that the solid shape does not adhere to the piston rod and is easily separated therefrom.

The piston assembly of the processing unit should be adapted to slide smoothly but easily in the processing unit chamber. Thus, press fits are of course avoided, and in addition, a small but significant clearance should be provided at the area of contact, to permit back flow of liquid phase which is being separated from the solid phases. This clearance is normally of the order of magnitude of about 0.0005 inch per inch of diameter, up to about 0.0030 inch per inch of diameter. Thus, in the case of a piston and chamber of three inch nominal diameter, the clearance on the diameter would be about 0.006 to about 0.008 inch. Clearances above this range are to be avoided, because as previously described, rapid upward movement of the piston tends to establish to degree of vacuum in the processing unit which materially assist in flow of sludges to the processing space.

Various motor means can be provided to actuate the apparatus. The preferred operating motor is a hydraulic motor, since this readily allows a steady uniform application of pressure through an entire stroke. The apparatus is not restricted to such a motor, however, and if desired gear driven devices can be employed, or even manually actuated devices such as a threaded screw to actuate the piston rod. It will be clear that the preferred powering motor is a hydraulic device.

As illustrative of the application of a preferred embodiment of the present invention, in a highly suitable example, a piston having a stroke of not more than about 12 inches is provided, with a piston diameter or processing chamber diameter of the order of 4 to 2 inches. Employing a piston rod of from one to two inches in diameter, a die aperture establishing a minimum diameter of about 0.125 inch greater than the piston rod diameter is employed. A typical sludge fed to the storage or supply chamber contains the following composition:

| | Weight percent |
|---|---|
| Lead metal | 80 |
| Water | 12 |
| Tetraethyllead | 8 |

The water was accompanied by significant quantities of dissolved sodium chloride. The lead particles of this sludge have a mean diameter of from 0.01 to 0.02 inch, with an appreciable portion being retained on a serum having openings 0.08 inch square.

The working ratio of the unit is about 6:1, and it is determined that the relative speed of metal being discharged, relative to the piston rod is about 5:1. In operation of an apparatus of this character, employing a maximum pressure of the order of about 15,000 pounds per square inch on a sludge charge, a high degree of separation of the liquids from the solids is obtained and the solids are forced out as generally cylindrical or annular shapes which are readily separated, collected, and passed to further recovery operations for smelting recovery.

Having fully described the apparatus of the invention and the various modifications thereof, what is claimed is as follows:

1. An apparatus for the processing of a high solid sludge, said sludge comprising a sub-divided malleable metal and at least one liquid phase, comprising a feed vessel having a bottom supply zone and a discharge opening in substantially the lowest portion of said zone, and a withdrawal and processing unit or assembly, said assembly including an elongated processing chamber of uniform cross section in substantially a vertical position, the uppermost end of said chamber opening into the supply zone, and having a die at the bottom of said processing chamber or zone, said die including an aperture partially occupied by a piston rod as hereafter defined and thereby providing a portion of said aperture for discharge of processed metal solid, a piston reciprocable within the said chamber and relatively snugly fitting therein, and a piston rod attached to the piston and extending through the aforementioned aperture in the die for reciprocation of the piston by external means, the piston being reciprocable from a lowermost position near the die to an uppermost position entirely within the said supply zone and above the discharge opening of said zone, whereby an opening for sludge flow into the processing chamber is established.

2. The apparatus of claim 1 further defined in that guide means are provided in the bottom supply to guide the piston in said zone.

3. The apparatus of claim 1 further defined in that the aperture for discharge of the processed metal solid is an annular portion of the opening established by the piston rod and the surrounding aperture in the die.

4. The apparatus of claim 3 further defined in that the wall of the surrounding aperture includes two frusto-conic sections, one section opening into the processing chamber and converging away therefrom, the other section diverging away from the said chamber.

5. Process for treating high solids sludges, comprising sub-divided metals and at least one liquid phase, comprising providing a supply of said sludge in a supply zone having a bottom opening communicating with a processing zone, downwardly extending therefrom and having a discharge opening in the bottom thereof, and reciprocating a piston member, fitting in said processing zone, from a position approaching the discharge opening therein to a position entirely within the supply zone and above the bottom opening therefrom, feeding the sludge while the piston member is in said position in said supply zone, and then pressing the sludge by moving the piston members into the processing zone toward the discharge opening, and discharging the metal solids as a substantially liquid free shape.

References Cited in the file of this patent

UNITED STATES PATENTS 2,711,686     Denison et al. _____ June 28, 1955